UNITED STATES PATENT OFFICE.

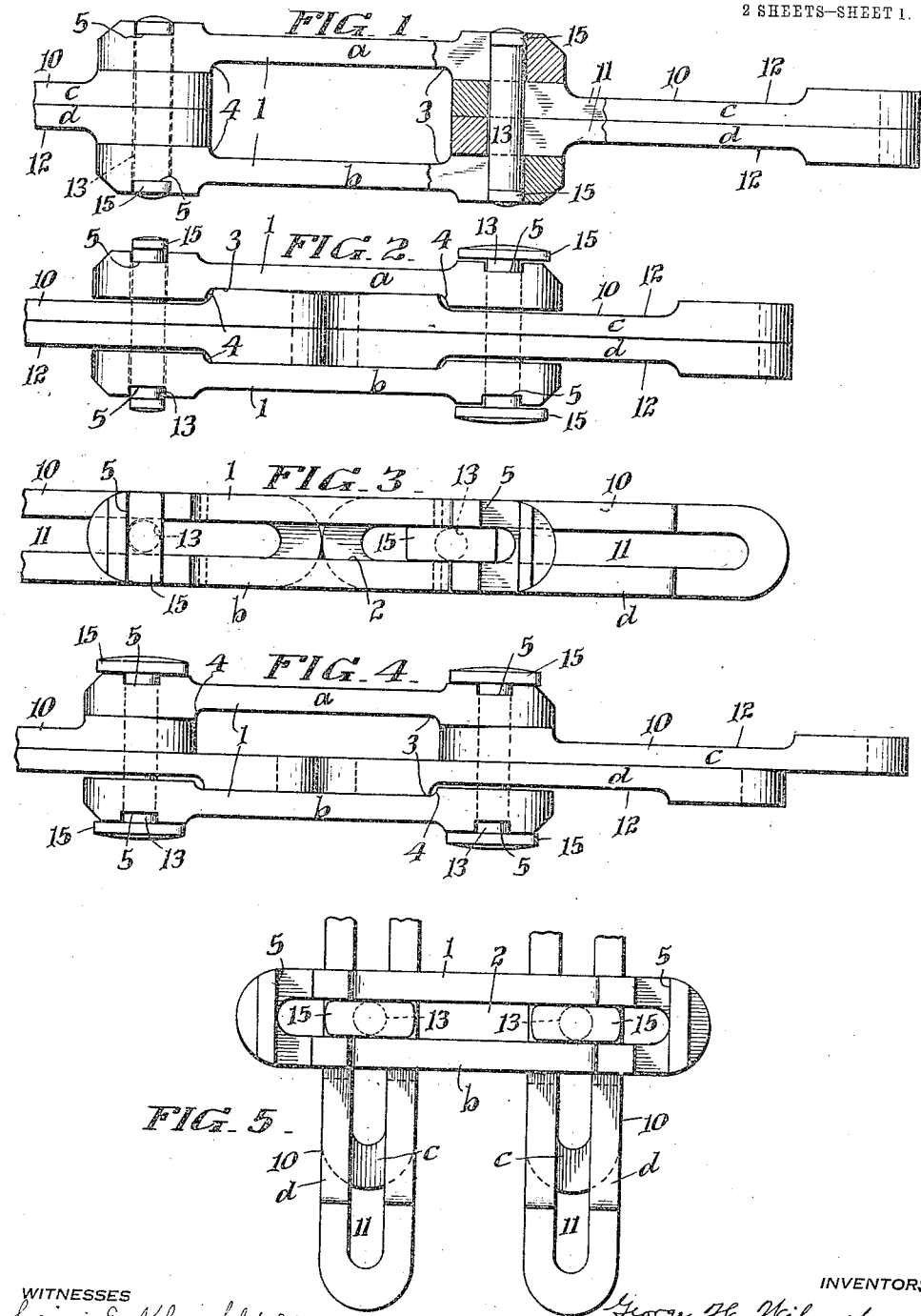

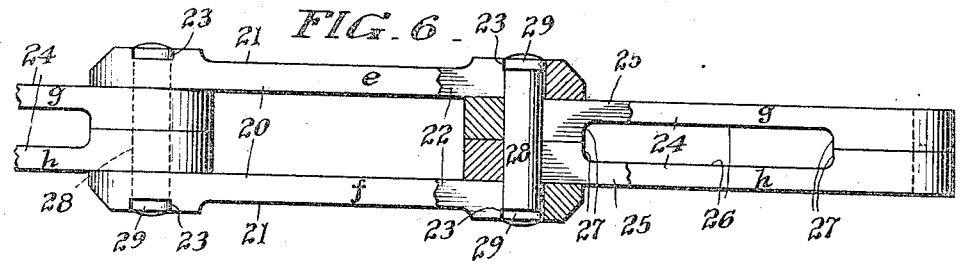
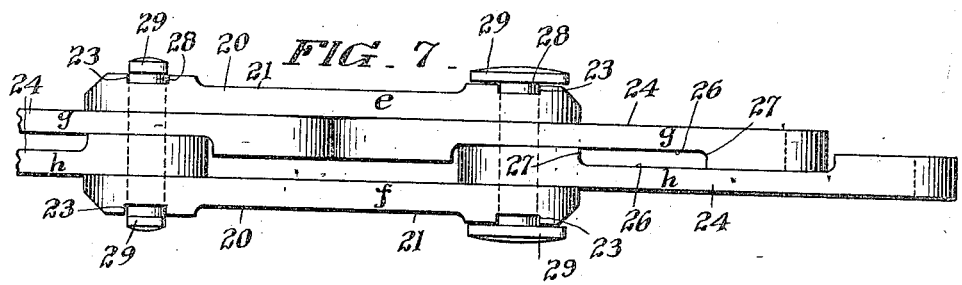
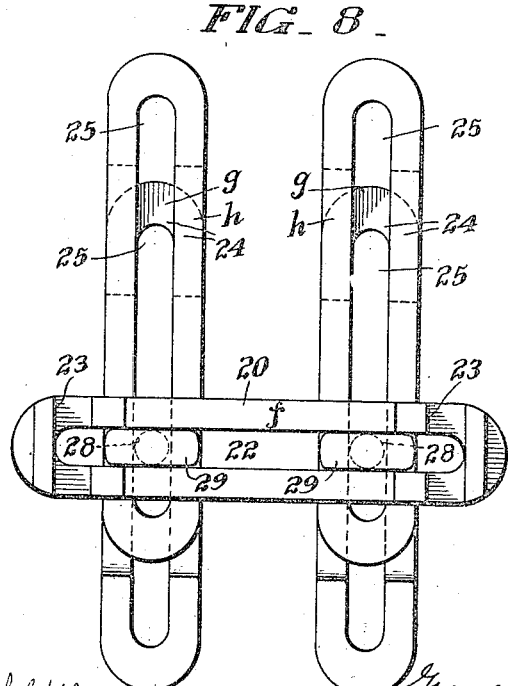

GEORGE W. WILMOT, OF HAZLETON, AND JAMES H. WESTON, OF TAMAQUA, PENNSYLVANIA.

DRIVE-CHAIN.

1,122,831.  Specification of Letters Patent.  Patented Dec. 29, 1914.

Application filed January 11, 1913. Serial No. 741,404.

*To all whom it may concern:*

Be it known that we, GEORGE W. WILMOT, a citizen of the United States, and a resident of Hazleton, county of Luzerne, State of Pennsylvania, and JAMES H. WESTON, a citizen of the United States, and a resident of Tamaqua, county of Schuylkill, State of Pennsylvania, have invented certain new and useful Improvements in Drive-Chains, of which the following is a specification.

Our invention relates to improvements in drive chains comprising link members capable of being separated and disconnected as may be desired by reason of the fact that they are connected together by removable pintles or pivots.

Our invention comprehends the improved construction hereinafter described in the specfication and particularly pointed out in the claims.

In order that the same may be more readily comprehended and understood we have illustrated convenient forms of embodiment thereof in the accompanying drawings in which,—

Figure 1 is a view partly in plan and partly in horizontal longitudinal section of one form of construction of chain embodying our invention; Fig. 2 is a plan view of a portion of such a chain with the links and connecting devices in different relative positions; Fig. 3 is a side elevation of the same with the parts in the position shown in Fig. 2; Fig. 4 is a plan view of a portion of chain with the links in a second different relative position; Fig. 5 is a side elevation with certain of the links turned from the positions shown in Fig. 4 to positions at right angles thereto and moved inwardly of a link to which they are connected; Fig. 6 is a view partly in plan and partly in horizontal longitudinal section showing a portion of chain of modified construction embodying our invention; Fig. 7 is a plan view of the same with the links and the connecting devices in different relative positions; and Fig. 8 is a side elevation with certain of the links turned into positions at right angles to the positions in which they are shown in Fig. 7 and being moved inwardly of the link to which they are connected to permit disconnection of the said links.

Referring to Figs. 1 to 5 of the drawings,—1 designates a link consisting of two members *a* and *b* in general parallel spaced relation with respect to each other. Each of the said members *a* and *b* is slotted, as indicated at 2. The slot in each member extends the greater portion of the length of such link terminating at points relatively near to the ends thereof in curved ends. The sides of the said slot are straight, as shown in Fig. 2 of the drawings. The central portions of the inner sides of each of these members *a* and *b* are recessed, as indicated at 3, thereby forming shoulders 4 at points situated relatively short distances from the ends of said members. The outer sides of the members *a* and *b* are also recessed or cut away, as indicated at 4, for the purpose of removing unnecessary material thereby lightening the construction. Notches 5, which extend transversely of the members *a* and *b* at their opposite ends and upon their outer sides, are formed for a purpose to be hereinafter described. 10 designates a link consisting of two members *c* and *d*, slotted as indicated at 11, which members have their outer central side portions recessed, as indicated at 12. The respective links 10, as illustrated, consist of two members *c* and *d*, but when such links are separated from links 1 by moving the said links into the positions with respect to each other shown in Figs. 2 and 3 of the drawings, they may consist of a single integral member, should such integral structure be preferred. The links 1 and 10, as will be understood, alternate with each other. The ends of the links 10 in the chain structure are situated intermediate the adjacent ends of the members *a* and *b* of links 1, as shown in the drawings. The links are connected to each other by means of pintles 13 which extend through the slots 2 and 11 in the links 1 and 10. The opposite ends of the pintles are provided with heads 15 of a length greater than the width of the slots 2 and 11, whereby when the pintles are in position and are turned with the said heads extending transversely of the links, as shown in Fig. 1 of the drawings, the ends of the said heads occupy positions in the notches 5 in the outer sides of the opposite ends of the members *a* and *b* upon the opposite sides of the ends of the slots 2. The positioning of the ends of these heads in the said notches prevents the turning of the said pintles so as to place the said heads in a position lengthwise of the slots 2 and 11 in which latter position the pintles would be permitted to be removed.

In order to disconnect the links 1 and 10 from each other, the latter, consisting of the parts c and d as illustrated, or if preferred a single solid member may be moved inwardly toward the links 1, as shown in Figs. 2 and 3, in which position the enlarged opposite ends of the link 10 are positioned between the recessed portions 3 of the members a and b of the link 1, whereby the latter are permitted to be moved toward each other so as to permit the turning of the pintles to bring the heads 15 thereof lengthwise of and in parallel relation to the links, as shown in said Figs. 2 and 3. The slots 2 and 11 in the links registering with each other when the parts are in the position shown in Figs. 2 and 3 permit the sliding of the pintles therethrough and the removal of the same from the links, the said links being thereby disconnected from each other. Instead, however, of moving both members c and d of the links 10, as shown in Figs. 2 and 3, one of the said members, for instance d, may be moved inwardly as shown in Fig. 4, which, by reason of the recesses 3 of the members a and b of the link 1 and the recess 12 in the member d, permits movement of the parts a and b toward each other sufficient distances to permit the turning of the pintle 13 to bring the heads thereof lengthwise of and parallel with the slots 2 in the members a and b. The members c and d of the links 11 are then turned so as to position the same at right angles to the members a and b of a link 1 and are then moved inwardly as shown in Fig. 5 in order to move the pintles into positions to permit the removal of an adjacent member a or b of the link 1.

Referring to Figs. 6, 7 and 8, 20 designates links comprising members e and f, the outer sides of the central portions thereof being recessed or cut away, as indicated at 21, for the purpose of removing unnecessary weight and thereby lightening the structure. The members e and f are provided with slots 22 for a purpose to be hereinafter described. 24 designates a link comprising two members g and h having slots 25 therein and also having the central inside portions recessed, as indicated at 26, to form shoulders 27. The depth of these shoulders is such that when one of the members g or h is moved inwardly so that one of the shoulders 27 thereof is situated beyond the adjacent overlapped end of the other member, as shown in Fig. 7, with the relatively thick end portion of such last mentioned member, for example, h, in contact with the relatively thin portion of the other member g, the members e and f of the link may be moved toward each other to the positions shown in Fig. 7. As in the constructions shown in Figs. 1 to 5 of the drawings, the links are connected together by means of pintles 28 having elongated heads 29 the opposite ends of which normally occupy the notches 23 in the opposite ends of the members e and f of links 20. When the members e and f have been moved toward each other into the positions shown in Fig. 7 the heads 29 are permitted to be turned together with the pintles so that the former may be brought into positions lengthwise of and in parallel relation with the slots 22 in the members e and f. To remove the pintles and thus disconnect the ends of any two adjacent links, the members g and h of a link are moved into the positions with respect to each other shown in Fig. 7 and are turned into positions at right angles to a link 20 and are then moved inwardly so as to carry the pintles into positions to permit the removal of one of the members e or f in a manner clearly indicated in Fig. 8 of the drawings.

We claim:—

1. A chain comprising links consisting of members spaced apart, the said members having longitudinal slots therein and being provided upon their outer sides at their opposite ends with notches extending transversely thereof across the ends of the said slots, and the inner sides of the central portions of the said members being recessed as described, links alternating with the first named links and having longitudinal slots therein and the ends thereof occupying positions intermediate the adjacent ends of the first named links, pintles extending through the slots in the overlapping ends of the said links to pivotally connect the same together, the said pintles having heads which occupy the notches aforesaid and the said second named links respectively having the central portions of their outer sides recessed as described, whereby when the said second named links are moved inwardly with respect to the first named links so that their wider end portions occupy the space between the recessed central portions of the members of the first named links said latter members may be moved toward each other to permit the turning and the removal of the pintles.

2. A chain, alternate links of which consist of two members spaced apart, the said members being provided with slots extending longitudinally thereof and also having transverse notches upon their outer sides at their opposite ends which notches extend across the outer ends of said slots and the central inside portions of the said members being recessed, other links alternating with the first named links and having slots extending longitudinally thereof and having their opposite ends positioned between adjacent ends of the members of the first named links, pintles extending through the slots in the adjacent overlapping ends of the said links, the said pintles having heads upon their outer ends which normally occupy the said notches, and each of the said second named links being recessed upon their outer sides whereby their opposite end portions are of a thickness considerably greater than their central portions and whereby when one end portion of one of the said second named links is moved longitudinally toward one of the adjacent first named links the members of the latter are permitted to approach each other whereby the connecting pintle may be removed.

In testimony that we claim the foregoing as our invention we have hereunto signed our names this 31st day of December A. D. 1912.

GEORGE W. WILMOT.
JAMES H. WESTON.

In the presence of—
WILLIAM F. LEOPOLD,
CHAS. F. ALLEN.